Sept. 16, 1930.  L. S. COPELIN  1,775,889
CORE DRILL CONSTRUCTION
Filed April 9, 1928
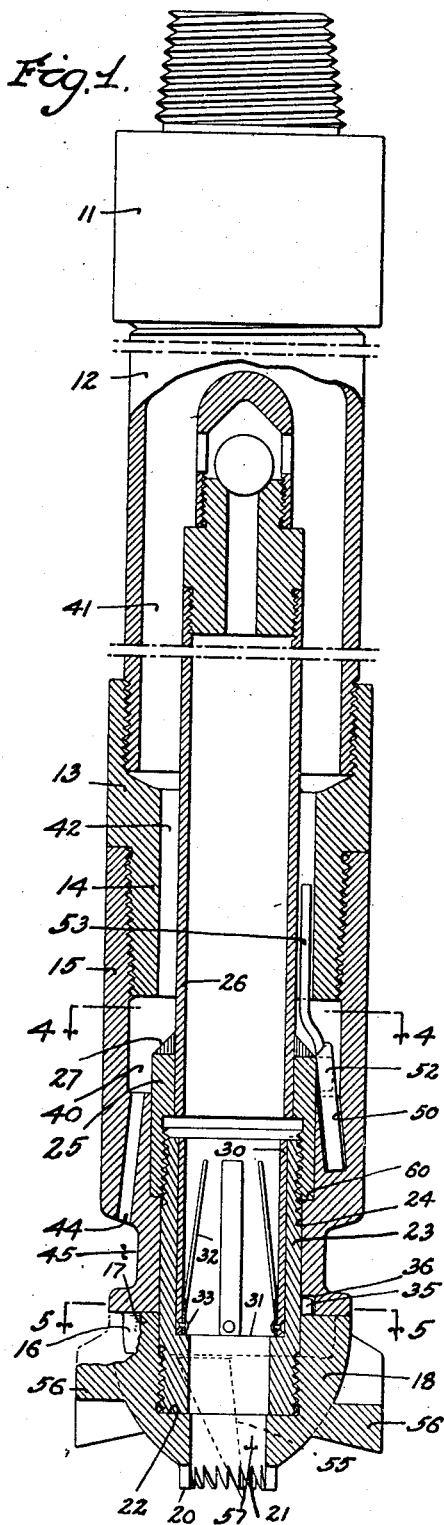
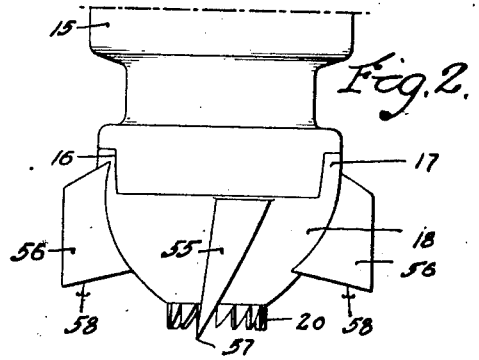
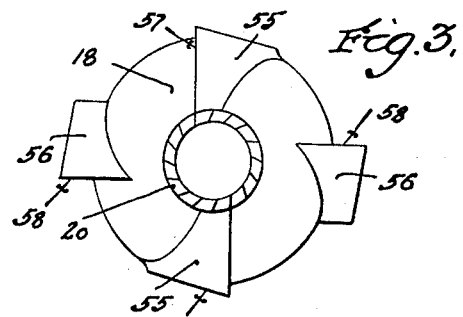
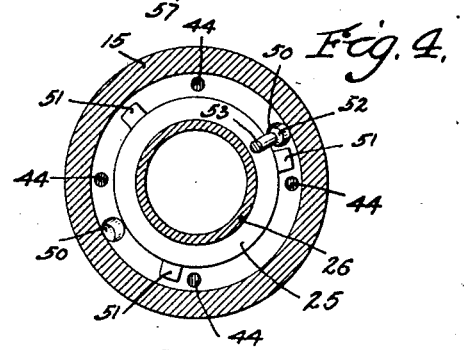
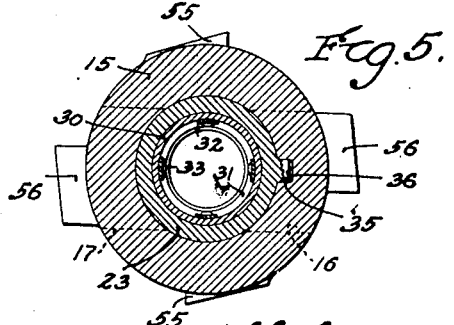
INVENTOR
LEONARD S. COPELIN
By
ATTORNEY Patented Sept. 16, 1930

1,775,889

UNITED STATES PATENT OFFICE

LEONARD S. COPELIN, OF LOS ANGELES, CALIFORNIA

CORE-DRILL CONSTRUCTION

Application filed April 9, 1928. Serial No. 268,763.

My invention relates to the art of taking cores, being more particularly a core drill of the double barrel type in which means are provided for locking the parts together against accidental disengagement. Ordinarily core drills of the type referred to are made of a number of parts threaded together, and it frequently happens that, due to the rotary movement of the drill during the drilling operations, the parts become unthreaded and are lost in the hole, thereby causing a fishing operation, which is highly undesirable, both from the viewpoint of expense involved and time lost in recovering parts of the drill.

The principal object of my invention is to provide simple and efficient means for locking the parts of the drill together so that accidental unthreading of the parts is prevented.

Other objects and advantages will appear hereinafter from the following description.

Referring to the drawings, which are for illustrative purposes only,

Fig. 1 is a vertical sectional view, partly in section, showing a core drill embodying a form of my invention.

Fig. 2 is a side elevation of the lower end of the drill shown in Fig. 1.

Fig. 3 is an inverted plan view of the drill as shown in Fig. 2.

Fig. 4 is a sectional plan view on line 4—4 of Fig. 1, and

Fig. 5 is a sectional plan view on line 5—5 of Fig. 1.

More specifically describing the form of my invention shown in the drawings, 11 indicates a sub adaptable for attachment to the lower end of a drill string (not shown). Threaded into the lower end of the sub is the outer barrel 12 of the core drill, such outer barrel being of proper length to take the length of core desired.

The lower end of the barrel 12 is threaded into the upper end of a tool joint 13, such tool joint having a reduced lower end 14, threaded to receive the upper end of a drill body 15. The drill body is provided at its lower end with transverse slots 16 to receive keys 17 formed on the cutter head 18, such cutter head being bowl-shaped and terminating at its lower end in a circular cutter 20 consisting of a series of teeth arranged about a core receiving opening 21.

22 designates a circular shoulder formed in the head 18 upon which is seated the lower end of a sleeve 23, such sleeve being threaded into the head 18, as clearly shown in Fig. 1.

The sleeve 23 extends through a central bore 24 in the body, and is threaded at its upper end to receive a locking nut 25, such locking nut being secured to the lower end of the core receiving tube or barrel 26 by means of welding, as indicated at 27, or in any other suitable manner.

30 designates a core catcher which, in the form shown, consists of a thin pipe section seated at its lower end on a shoulder 31, formed in the sleeve 23, a series of inwardly and upwardly extending spring fingers 32 being secured to the inner walls of the pipe section by means of rivets 33 or other suitable fastening means.

35 designates a lug formed on the sleeve 23 and extending outwardly therefrom into a recess 36 formed in the body 15 at the base of one of the slots 16, the walls of such recess preventing turning movement of the sleeve in the body 15 by engagement with the lug 35.

40 designates a circular chamber formed in the body 15 which receives circulating fluid from the passage 41 formed between the inner and outer barrels, such chamber being connected therewith through a circular passage 42 formed between the inner barrel and the inner walls of the tool joint 13.

From the chamber 40 circulating fluid is discharged through ducts or passages 44 into an annular space 45 formed in the body 15. Extending downwardly from the chamber 40 in the body 15 is a series of sockets or recesses 50, there being two such sockets arranged diametrically opposite to each other in the body.

Formed on the locking nut 25 are a series of lugs 51, in the present instance there being three such lugs. 52 designates a locking bar or pin adapted to extend into either one of the sockets 50 and into the path of the lugs 51, a handle 53 being provided for the insertion of said locking bar, such handle extending upwardly therefrom and into the passage 42 in the tool joint, as clearly shown in Fig. 1.

The body in the present form is provided with four fluid outlets 44, as clearly illustrated in Fig. 4, and three lugs are used on the locking nut so that the locking bar may be inserted in either of the sockets 50 and engaged by one of the lugs without covering any of the fluid passages 44.

It is understood that any preferred form of cutting members may be used on the head 18, in the form shown two sets of blades 55 and 56 being formed on the head, the cutting edges 57 of the blades 55 being at or near the cutting level of the circular cutter 20, and the cutting edges 58 of the blades 56 being above the cutting edges of the blades 55. The cutting diameters of the two sets of blades are different in that the blades 56 extend laterally from the head a greater distance than the blades 55.

The core drill is assembled in the following manner: The sleeve 23 is threaded into the head 18, after which the sleeve is inserted in the drill body, with the keys 17 in the slots 16, the lug 35 entering the recess 36, in which assembled position the sleeve is prevented from turning in the drill body and the head also prevented from turning with respect to the drill body. The locking nut with the core receiving barrel 26 attached thereto is then threaded onto the end of the sleeve 23 until the lower end of the locking nut rests upon a shoulder 60 formed in the drill body, as shown in Fig. 1.

When in this position, the locking bar is placed in one of the sockets 50, as shown in Fig. 1, and due to the arrangements of lugs 51 on the locking nut, such nut cannot turn over one-third of a rotation and, consequently, cannot become disengaged from the body members 15.

After the parts are assembled as above described, the tool joint and outer barrel are attached to the body as above described.

I claim as my invention:

1. A rotary core drill construction comprising a drill body, a cutter head on said body, a sleeve in said body threaded to said head, interengaging means on said body and said sleeve for preventing relative rotative movement therebetween, an outer barrel on said head, and an inner barrel connected to said sleeve.

2. A rotary core drill construction comprising a drill body, a cutter head on said body, interengaging means on said head and said body to prevent relative rotative movement therebetween, a sleeve in said body threaded to said head, interengaging means on said body and said sleeve for preventing relative rotative movement therebetween, said interengaging means on said body and sleeve consisting of a lug on said sleeve extending into a recess in said body, an outer barrel on said head, and an inner barrel connected to said sleeve.

3. A rotary core drill construction comprising a drill body, a cutter head on said body, a sleeve in said body threaded to said head, interengaging means on said body and said sleeve for preventing relative rotative movement therebetween, an outer barrel on said head, an inner barrel connected to said sleeve, and means for limiting the relative rotative movement between said inner barrel and said head.

4. A rotary core drill construction comprising a drill body, a cutter head on said body, a sleeve in said body threaded to said head, interengaging means on said body and said sleeve for preventing relative rotative movement therebetween, an outer barrel on said head, and an inner barrel connected to said sleeve, said limiting means consisting of interengaging means between said inner barrel and said head.

5. A rotary core drill construction comprising a drill body, a cutter head on said body, interengaging means on said head and said body to prevent relative rotative movement therebetween, a sleeve in said body threaded to said head, interengaging means on said body and said sleeve for preventing relative rotative movement therebetween, an outer barrel on said head, and an inner barrel connected to said sleeve, said limiting means consisting of a lug extending outwardly from said inner barrel and a removable locking bar seated in said drill body extending into engageable position with said lug.

6. A rotary core drill construction comprising: a drill body; a cutter head and an outer barrel on said body; an inner barrel mounted in said body; and interengaging means for preventing relative rotative movement between said inner barrel and said body, said interengaging means comprising a lug extending outwardly from said inner barrel and a removable locking bar seated in said drill body extending into engageable position with said lug.

In testimony whereof, I have hereunto set my hand at Los Angeles, California, this 30 day of March, 1928.

LEONARD S. COPELIN.